United States Patent
Wang et al.

(10) Patent No.: US 12,535,612 B2
(45) Date of Patent: Jan. 27, 2026

(54) ANISOTROPIC RESISTIVITY AND DIELECTRIC CONSTANT MEASUREMENTS OF A SUBTERRANEAN FORMATION

(71) Applicant: Schlumberger Technology Corporation, Sugar Land, TX (US)

(72) Inventors: Gong Li Wang, Sugar Land, TX (US); Dean Homan, Damon, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/993,851

(22) PCT Filed: Jul. 6, 2023

(86) PCT No.: PCT/US2023/069669
§ 371 (c)(1),
(2) Date: Jan. 13, 2025

(87) PCT Pub. No.: WO2024/015701
PCT Pub. Date: Jan. 18, 2024

(65) Prior Publication Data
US 2025/0264630 A1     Aug. 21, 2025

Related U.S. Application Data

(60) Provisional application No. 63/368,292, filed on Jul. 13, 2022.

(51) Int. Cl.
*G01V 3/38* (2006.01)
*G01V 3/30* (2006.01)

(52) U.S. Cl.
CPC . *G01V 3/38* (2013.01); *G01V 3/30* (2013.01)

(58) Field of Classification Search
CPC .................................. G01V 3/38; G01V 3/30
See application file for complete search history.

(56) References Cited

U.S. PATENT DOCUMENTS 3,891,916 A   6/1975 Meador
4,899,112 A   2/1990 Clark
(Continued)

FOREIGN PATENT DOCUMENTS

WO   2006031872 A1   3/2006
WO   2022056147 A1   3/2022

OTHER PUBLICATIONS

Wu et al., Dielectric-Independent 2-MHz Propagation Resistivities. Society of Petroleum Engineers, SPE Annual Technical Conference and Exhibition held in Houston, Texas, Oct. 3-6, 1999, 19 pages.
(Continued)

*Primary Examiner* — Lina Cordero
*Assistant Examiner* — Lynda Dinh
(74) *Attorney, Agent, or Firm* — Jeffrey D. Frantz

(57) ABSTRACT

A method for estimating vertical and horizontal resistivity values and vertical and horizontal dielectric constant values of a multi-layer, anisotropic subterranean formation includes acquiring electromagnetic propagation measurements of the subterranean formation and inverting the measurements using a one-dimensional formation model to compute the anisotropic resistivity and anisotropic dielectric constant values. The model includes a plurality of formation layers in which each of the formation layers has corresponding vertical and horizontal real conductivity and vertical and horizontal imaginary conductivity values.

14 Claims, 3 Drawing Sheets

(56) References Cited

U.S. PATENT DOCUMENTS

| | | | | |
|---|---|---|---|---|
| 6,092,024 | A | * | 7/2000 | Wu .................... G01V 3/28 |
| | | | | 702/7 |
| 6,643,589 | B2 | * | 11/2003 | Zhang ................. G01V 3/28 |
| | | | | 702/10 |
| 2010/0324826 | A1 | | 12/2010 | Luling |
| 2014/0214324 | A1 | | 7/2014 | Freedman |
| 2015/0241592 | A1 | | 8/2015 | Itskovich |
| 2016/0054467 | A1 | * | 2/2016 | Li ..................... E21B 49/00 |
| | | | | 702/7 |
| 2016/0109614 | A1 | * | 4/2016 | Wu .................... G01V 3/38 |
| | | | | 702/7 |
| 2016/0170069 | A1 | | 6/2016 | Wang |
| 2016/0245080 | A1 | | 8/2016 | Sun |
| 2017/0254921 | A1 | * | 9/2017 | Wu .................... E21B 47/00 |
| 2018/0003853 | A1 | * | 1/2018 | Ewe ................... G01V 3/28 |
| 2019/0129056 | A1 | | 5/2019 | Rasmus |
| 2019/0353819 | A1 | * | 11/2019 | Wang .................. G01V 3/38 |

OTHER PUBLICATIONS

Haugland, S. M., New Discovery with Important Implications for LWD Propagation Resistivity Processing and Interpretation, Paper LL, Presented at SPWLA 60th Annual Logging Symposium held in Houston, Texas, USA, Jun. 17-20, 2001, 14 pages.

Anderson et al., Observations of Large Dielectric Effects on LWD Propagation-Resistivity Logs, Paper BB, Presented at SPWLA 48th Annual Logging Symposium held in Austin, Texas, United States, Jun. 3-6, 2007, 11 pages.

Stalheim, S. O., Deducting dispersive permittivity from LWD resistivity measurements: Paper VVVV, Presented at SPWLA 60th Annual Logging Symposium held in the Woodlands, TX, USA, Jun. 17-19, 2019, 18 pages.

Wang et al., Determining resistivity and lowfrequency dielectric constant using induction data in the presence of strong induced polarization, Paper PP, Presented at the SPWLA 60th Annual Logging Symposium held in the Woodlands, TX, USA Jun. 17-19, 2019, 17 pages.

Wang et al., Model-based correction for dip and shoulder effects on LWD propagation dielectric constant and resistivity logs, Presented at SPWLA 62nd Annual Logging Symposium held online from May 17-20, 2021, SPWLA-2021-0035, 18 pages.

Yan et al., 2-D Pixel-Based Inversion for Simultaneous Reconstruction of Resistivity and Dielectric Constant From Electromagnetic Logging While-Drilling Measurements, IEEE Transactions on Geoscience and Remote Sensing, vol. 60, Jul. 8, 2022, 2021, 14 pages.

* cited by examiner

ANISOTROPIC RESISTIVITY AND DIELECTRIC CONSTANT MEASUREMENTS OF A SUBTERRANEAN FORMATION

CROSS REFERENCE TO RELATED APPLICATIONS

This application is a National Stage Entry of International Application No. PCT/US2023/069669, filed on Jul. 6, 2023, which claims priority to U.S. Provisional Patent Application No. 63/368,292, which was filed on Jul. 13, 2022, and is incorporated herein by reference in its entirety.

BACKGROUND

Electromagnetic logging measurements are commonly made in oilfield operations. Such measurements may provide formation resistivity and dielectric properties as well as information about remote geological features (e.g., remote beds, bed boundaries, and/or fluid contacts) not intercepted by the measurement tool. This information may be used to evaluate the water saturation and potential hydrocarbon bearing capacity of the formation as well as to provide information for steering the direction of drilling (e.g., in a geosteering operation).

Electromagnetic propagation measurements are primarily used to determine resistivity and resistivity anisotropy of subterranean reservoirs. In the majority of conventional reservoirs, the contribution of the displacement current on the measurement is so small that the dielectric constant can hardly be determined accurately at propagation frequencies. However, certain formations, such as clay bearing sedimentary formations, may have a large dielectric constant at propagation frequencies.

Methods for simultaneously determining resistivity and dielectric constant have been disclosed for use with isotropic formations. These methods assume, in the processing, that the formation is either a homogeneous isotropic formation or a planarly-layered isotropic formation. While these methods have been used to process field data and are sometimes able to provide dielectric logs of petrophysical significance for isotropic formations, they tend not to be suitable for use with anisotropic formations and can often yield unstable and erroneous dielectric constant values. There is a need in the art for methods of processing electromagnetic propagation measurements to determine both formation resistivity and robust dielectric constant values in multi-layer, anisotropic formations (e.g., clay bearing sedimentary anisotropic formations).

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
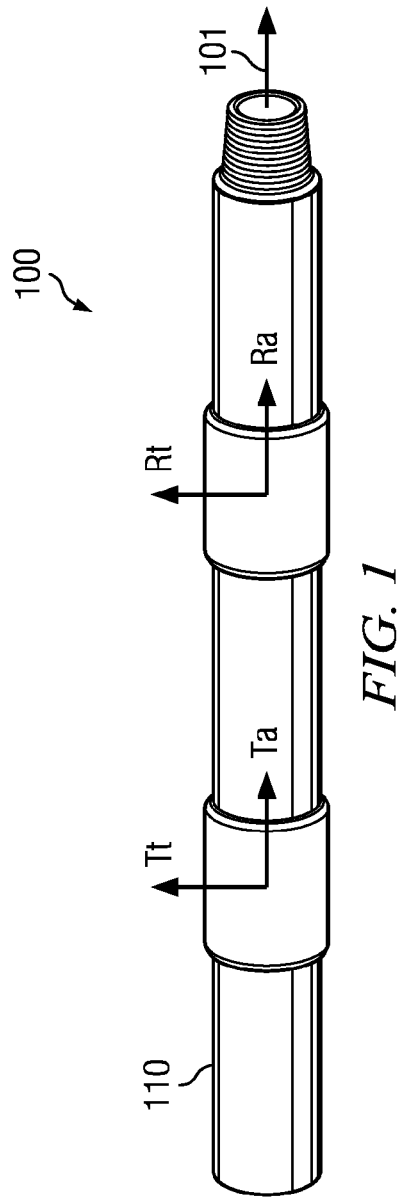
FIG. 1 depicts an example electromagnetic propagation tool that may be used to acquire electromagnetic logging measurements that may be processed to determine anisotropic resistivity and dielectric constant values of a multi-layer subterranean formation.

A method is disclosed for estimating vertical and horizontal resistivity values and vertical and horizontal dielectric constant values of a multi-layer, anisotropic subterranean formation. The method includes acquiring electromagnetic propagation measurements of the subterranean formation and processing the measurements via inversion to compute the anisotropic resistivity and anisotropic dielectric constant values. A one-dimensional formation model is utilized in the inversion. The model includes a plurality of formation layers in which each of the formation layers has corresponding vertical and horizontal resistivity values and vertical and horizontal dielectric constant values (anisotropic real and imaginary conductivities).

Example embodiments of the disclosed methods utilize a full-wave pixel inversion that determines vertical and horizontal resistivity and vertical and horizontal dielectric constant values simultaneously in a multilayer, anisotropic formation using data acquired by an electromagnetic propagation tool at a plurality of measured depths in wellbore. The multilayer formation model includes a plurality of layers (e.g., sedimentary beds) where the vertical and horizontal resistivity and dielectric constant values may vary from layer to layer. The bedding planes can be dipping relative to the tool plane. The inverse problem (the inversion) may be solved iteratively, for example, using a deterministic minimization approach such as a Gauss-Newton approach.

As noted above, prior art methods intended for use with isotropic formations tend not to be suitable for use with anisotropic formations and can often yield unstable and erroneous dielectric constant values. One aspect of the disclosed embodiments is the realization that these errors often result because the electromagnetic measurements are more sensitivity to the horizontal conductivities than the vertical conductivities and that failing to account for this sensitivity difference may lead to measurement errors.

In certain example embodiments, the use of the first derivative of the model for regularization is intended to ensure that the inversion converges rapidly for a wide range of initial guess models. The regularization coefficient may be selected, for example, using a minimization at each iteration step such that the data is neither over-fitted nor under-fitted. Moreover, the weight of the regularization term for both real vertical conductivity and imaginary vertical conductivity may be determined using corresponding measurement sensitivity information to ensure the vertical conductivities are not suppressed as they can be if the sensitivities are not considered in the inversion. This is in contrast to prior art techniques that do not consider a difference in sensitivity between vertical and horizontal real and imaginary conductivities. As described in more detail below, example ones of the disclosed embodiments advantageously make use of information contained in the measurement data to obtain the regularization term. The reconstructed formation model may therefore advantageously carry minimal bias from the developer and users and tends to be robust against noise in the measured data.

Dielectric constant and resistivity logs determined using prior art techniques that make use of a homogeneous formation model commonly suffer from bed boundary and dipping effects. As a result, the calculations of water/hydrocarbon saturation that use the dielectric constant and resistivity may also be adversely affected. In contrast, the disclosed methods may advantageously deliver vertical and horizontal dielectric constant and resistivity values free of bed boundary and dipping effects because the layering and dipping of the formation are considered automatically in the one-dimensional (1D) formation model of the inversion. Moreover, when the dielectric effect is non-negligible, the resistivity log obtained using conventional processing techniques may be affected by the dielectric constant through the skin effect. The disclosed methods may advantageously completely remove the dielectric effect on the resistivity log.

The dielectric constant obtained using the disclosed methods may advantageously be used to estimate water/hydrocarbon saturation of reservoirs on its own or together with resistivity, for example, using the complex reflective index method. The resistivity of the inversion may be used in place of conventional propagation resistivity logs where dipping, bed boundary and/or dielectric effects are non-negligible.

Anisotropic properties of the dielectric constant have been studied at hundreds of MHz to GHz frequencies, but not at the lower end of MHz frequencies and sub-MHz frequencies. Electromagnetic propagation logging measures formation properties with the phase shift and attenuation of an electromagnetic field at a frequency in a range from 200 kHz to 4 MHz. For example, commercial propagation tools frequently make propagation measurements at 400 kHz and/or 2 MHz. While the disclosed embodiments are described in more detail below with respect to electromagnetic propagation measurements, it will be understood that the methods described herein may be suitable for electromagnetic induction or electromagnetic propagation measurements made at frequencies in a range from 1 kHz to 10 MHz.

Dielectric constants can vary significantly with frequency within a small range of frequencies, for example, at propagation frequencies in a range from 400 kHz to 2 MHz. It will be understood that the dielectric constants obtained using the disclosed inversion represent the dielectric constant of the formation at the selected measurement frequency. Moreover, it will be appreciated that frequency-dependent dielectric constants may be determined by using the disclosed inversion on propagation measurements made at different frequencies separately.

Propagation measurements may be made by electromagnetically coupling an electromagnetic transmitter and one or more receivers. As is known to those of ordinary skill in the art, this antenna coupling may be accomplished by applying a time varying electrical current (an alternating current at a propagation frequency) in the transmitting antenna to transmit electromagnetic energy into the surrounding environment (including the formation). This is referred to as "firing" the transmitter. The transmitted energy generates a corresponding time varying magnetic field in the local environment (e.g., in the tool collar, borehole fluid, and formation). The magnetic field in turn induces electrical currents (eddy currents) in the conductive formation. These eddy currents further produce secondary magnetic fields which may produce a voltage response in a receiving antenna (the electromagnetic energy is received, for example, via measuring the complex valued voltage in the receiving antenna).

Those of ordinary skill in the art will readily appreciate that such measurements are commonly made while translating the electromagnetic measurement tool along the axis (or length) of the wellbore to obtain a plurality of measurements made at a plurality of corresponding measured depths in the wellbore. The measurements may be made using either logging while drilling or wireline logging tools. In certain embodiments, the measurements may be made using a plurality of transmitter receiver couplings (e.g., having a corresponding plurality of spacings along the axis of the tool and/or using a plurality collocated transmitters and/or collocated receivers). For example, a single transmitter firing may induce corresponding voltages in a plurality of collocated or spaced apart receivers. Moreover, multiple transmitters may be fired sequentially to induce voltages on one or more receivers to obtain a suite of measurements having plurality of couplings and spacings. The transmitters are commonly fired in rapid succession such that the suite of measurements is made at essentially the same measured depth in the wellbore.

Given a propagation tool including one transmitter (T) and two receivers ($R_1$ and $R_2$), its measurements may be given by:

$$AT + iPS = \ln\frac{V_1}{V_2} \quad (1)$$

where $V_1$ and $V_2$ represent voltages at corresponding receivers $R_1$ and $R_2$, and PS and AT represent phase shift and attenuation. The transmitter and two receivers may be pointed in an arbitrary direction. In a homogeneous and transversely-isotropic formation, when the transmitter and the receivers are pointed in the axial direction, the measurement may be expressed mathematically, for example, as follows:

$$AT + iPS = 3\ln\frac{L_2}{L_1} + ik_h(L_1 - L_2) + \ln\frac{1 - ik_hL_1}{1 - ik_hL_2} \quad (2)$$

where $k_h$ represents the wavenumber of the formation associated with horizontal conductivity and dielectric constant, $K_h = \sqrt{i\omega\mu(\theta_h - i\omega\varepsilon_h)}$, with $\omega$ being angular frequency of the operating current, $\mu$ being magnetic permeability, and $\sigma_h$ and $\varepsilon_h$ being horizontal electric conductivity and horizontal permittivity of the formation. With continued reference to Eq. (2), $L_1$ and $L_2$ represent axial spacings (distances) between the receivers $R_1$ and $R_2$ and the transmitter T. Note that a point magnetic dipole model has been used to arrive at Eq. (2). In addition, it has been assumed that the tool axis is perpendicular to the lamination plane.

When the transmitter and the receivers are pointed in a direction transverse to the tool axis, the measurement may be expressed mathematically, for example, as follows:

$$AT + iPS = 3\ln\frac{L_2}{L_1} + ik_h(L_1 - L_2) + \ln\frac{1 - ik_hL_1 - \frac{1}{2}(k_h^2L_1^2 + k_v^2L_1^2)}{1 - ik_hL_2 - \frac{1}{2}(k_h^2L_2^2 + k_v^2L_2^2)} \quad (3)$$

where $k_v$ represents the wavenumber of the formation associated with vertical conductivity and dielectric constant and $k_v = \sqrt{i\omega\mu(\sigma_v - i\omega\varepsilon_v)}$. Eqs. (2) and (3) indicate that propagation measurements using transverse antennas may include anisotropy information of both formation conductivity and dielectric constant.

Electromagnetic propagation measurements are commonly made using electromagnetic propagation tools. The electromagnetic propagation tools can include those presently known in the art or future tools. Examples of electromagnetic propagation tools include, but are not limited to, PeriScope™, ARC™, IMPulse™, EcoScope™, CDR™, MCR™, GeoSphere™, and IriSphere™ which are available from Schlumberger®. It will be appreciated that the electromagnetic propagation measurements may be made using wireline electromagnetic logging tools or logging while drilling (LWD) electromagnetic propagation tools. The disclosed embodiments are not limited in this regard. Moreover, it will be appreciated by those of ordinary skill in the art that the disclosed embodiments may be applied to electromagnetic induction measurements made using either wireline or logging while drilling (LWD) electromagnetic logging tools.

Figure 2:
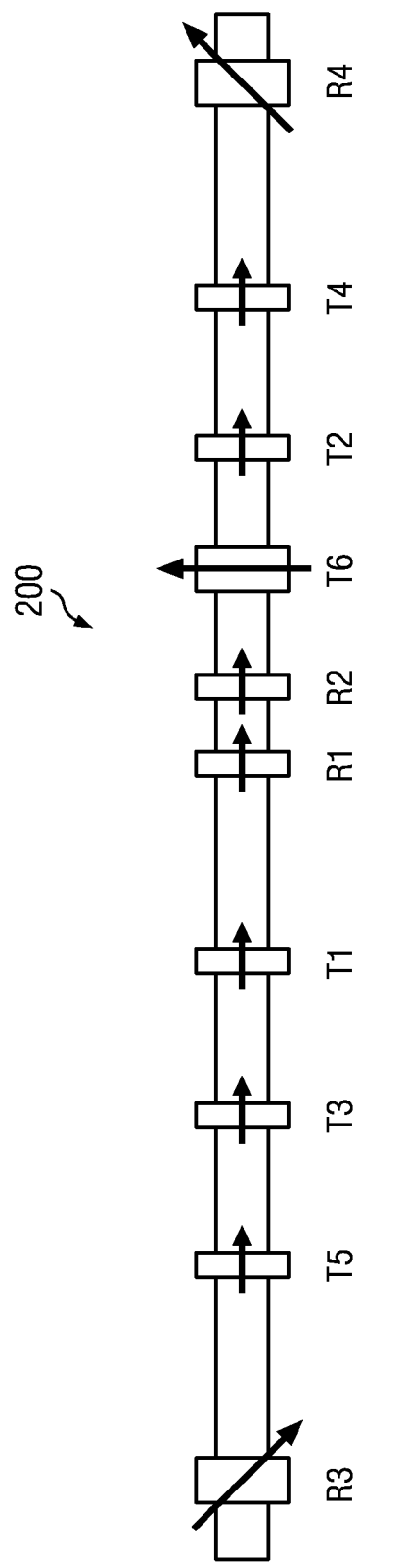
FIG. 2 depicts a portion of another example electromagnetic propagation tool that may be used to acquire electromagnetic logging measurements that may be processed to determine anisotropic resistivity and dielectric constant values of a multi-layer subterranean formation.

FIGS. 1 and 2 depict example propagation tools that may be used to acquire electromagnetic propagation measurements that may in turn be processed to compute anisotropic resistivity and dielectric constant values of a multi-layer subterranean formation. FIG. 1 depicts a portion of a propagation tool 100 including a transmitter T and a receiver R axially spaced apart on tool collar 110. Those of ordinary skill will readily recognize that substantially any suitable transmitter and receiver spacing may be utilized to achieve a desired measurement depth of measurement. Moreover, it will be understood that while not depicted, the propagation tool 100 may include multiple transmitters and receivers spaced apart on the tool body, thereby enabling multiple propagation measurements (or sets of propagation measurements) to be made at multiple spacings (e.g., at spacing distances up to 30, 50, or even 100 feet) (e.g., 10, 20, or 30 meters).

In the depicted embodiment, the transmitter T and receiver R each include at least one axial antenna Ta, Ra and at least one transverse antenna Tt, Rt. In advantageous embodiments, the transmitter T and receiver R may each include a triaxial antenna arrangement that includes, for example, an axial antenna and first and second transverse antennas that are orthogonal to one another. Such antenna configurations may be advantageously used to make full tensor propagation measurements.

With continued reference to FIG. 1, propagation tool 100 is a directional tool that can measure transverse and cross couplings that may be processed to determine formation resistivity, resistivity anisotropy, formation dielectric constant, and dielectric constant anisotropy as well as formation dip and azimuth. As is known to those of ordinary skill in the art, an axial antenna is one whose moment Ta, Ra is substantially parallel with the longitudinal axis 102 of the collar 110. Axial antennas are commonly wound about the circumference of the collar 110 such that the plane of the antenna is substantially orthogonal to the tool axis. A transverse antenna is one whose moment Tt, Rt is substantially perpendicular to the longitudinal axis of the tool. A transverse antenna may include, for example, a saddle coil.

FIG. 2 depicts a schematic of another example electromagnetic propagation tool that may be used to acquire electromagnetic propagation measurements (data) to be processed using the disclosed methods. Propagation tool 200 is a directional tool that can measure transverse and cross couplings that may be processed to determine formation resistivity, resistivity anisotropy, formation dielectric constant, and dielectric constant anisotropy as well as formation dip and azimuth. Propagation tool 200 may include PeriScope™ or other known commercially available tools or future tools. In the depicted embodiment, propagation tool 200 includes a transverse transmitter T6 and tilted receivers R3 and R4 in addition to a number of axial transmitters and receivers. The depicted embodiment further includes axial transmitters T1, T2, T3, T4, and T5 deployed about a pair of axial receivers R1 and R2.

It will be understood that the disclosed embodiments are expressly not limited to the propagation tool embodiments depicted on FIGS. 1 and 2. The disclosed embodiments may be used to process substantially any suitable electromagnetic propagation measurements obtained from substantially any suitable electromagnetic propagation tool configuration, for example, including axial, transverse, tilted, biaxial, and triaxial antenna arrangements. Such antenna arrangements are well known in the industry and commonly used in electromagnetic transmitters and receivers used in propagation tools.

It will be further understood that the disclosed embodiments are not limited to the use of either wireline or logging while drilling (LWD) electromagnetic propagation measurements. While FIGS. 1 and 2 depict LWD embodiments, the disclosed embodiments may equivalently utilize electromagnetic propagation measurements made using wireline logging tools.

It has been observed that sometimes propagation phase shift and attenuation resistivity logs are clearly separate from each other in shales or shaly sands. Attenuation resistivity can read significantly higher than phase shift resistivity. This unusual behavior has been interpreted as caused by the presence of the interfacial polarization in the formation. The magnitude of the difference between phase shift and attenuation resistivity readings indicates that the dielectric constant may be determined in these formations at reasonable accuracy using propagation data.

In the presence of a large dielectric signal and anisotropy in the formation, the formation conductivity is complexed-valued and can be written as:

$$\hat{\sigma} = \sigma_R - i\sigma_X \quad (4)$$

where the first term, $\sigma_R = \hat{t}\hat{t}\sigma_{R,h} + \hat{n}\hat{n}\sigma_{R,v}$ represents the real anisotropic conductivity, with the unit vector $\hat{t}$ being a direction parallel to the bedding planes, and the unit vector $\hat{n}$ being a direction normal to the bedding planes. $\sigma_{R,h}$ and $\sigma_{R,v}$ represent real horizontal and vertical conductivities. It will be appreciated that the notation $\hat{t}\hat{t}$ and $\hat{n}\hat{n}$ indicates that formation conductivities may be tensor quantities. The second term $\sigma_X = \hat{t}\hat{t}\sigma_{X,h} + \hat{n}\hat{n}\sigma_{X,v}$ represents the imaginary anisotropic conductivity. $\sigma_{X,h}$ and $\sigma_{X,v}$ represent imaginary horizontal and vertical conductivities (each of which may be a tensor quantity). The imaginary conductivities are related to the dielectric constants as follows: $\sigma_{X,h} = \omega\varepsilon_0\varepsilon_{r,h}$ and $\sigma_{X,v} = \omega\varepsilon_0\varepsilon_{r,v}$. In these two equations, $\varepsilon_{r,h}$ and $\varepsilon_{r,v}$ represent horizontal and vertical dielectric constants, and $\varepsilon_0$ represents the electric permittivity in a vacuum. The time dependence has been assumed to be $\exp(-i\omega t)$, where $\omega$ represents angular frequency and $i$ is the imaginary unit, $i=\sqrt{-1}$.

In certain embodiments, the anisotropic, real and imaginary conductivities $\sigma_{R,h}$, $\sigma_{R,v}$, $\sigma_{X,h}$ and $\sigma_{X,v}$ may be found via inversion (as described in more detail below). These conductivities may in turn be further processed to compute corresponding anisotropic resistivity values and anisotropic dielectric constant values for the formation. For example, horizontal and vertical resistivity values $R_h$ and $R_v$ may be obtained by computing inverses of the corresponding inverted real conductivity values $\sigma_{R,h}$ and $\sigma_{R,v}$, for example, as follows: $R_h=1/\sigma_{R,h}$ and $R_v=1/\sigma_{R,v}$. The horizontal and vertical dielectric constant values $\varepsilon_{r,h}$ and $\varepsilon_{r,v}$ may be computed from the imaginary conductivities, for example, as follows:

$$\varepsilon_{r,h} = \frac{\sigma_{X,h}}{\omega\varepsilon_0} \text{ and } \varepsilon_{r,v} = \frac{\sigma_{X,v}}{\omega\varepsilon_0}.$$

Given these simple relationships, it will be appreciated that in this disclosure the terms horizontal and vertical resistivity may be used interchangeably with horizontal and vertical real conductivity and that the terms horizontal and vertical dielectric constant may be used interchangeably with horizontal and vertical imaginary conductivity.

Figure 3:
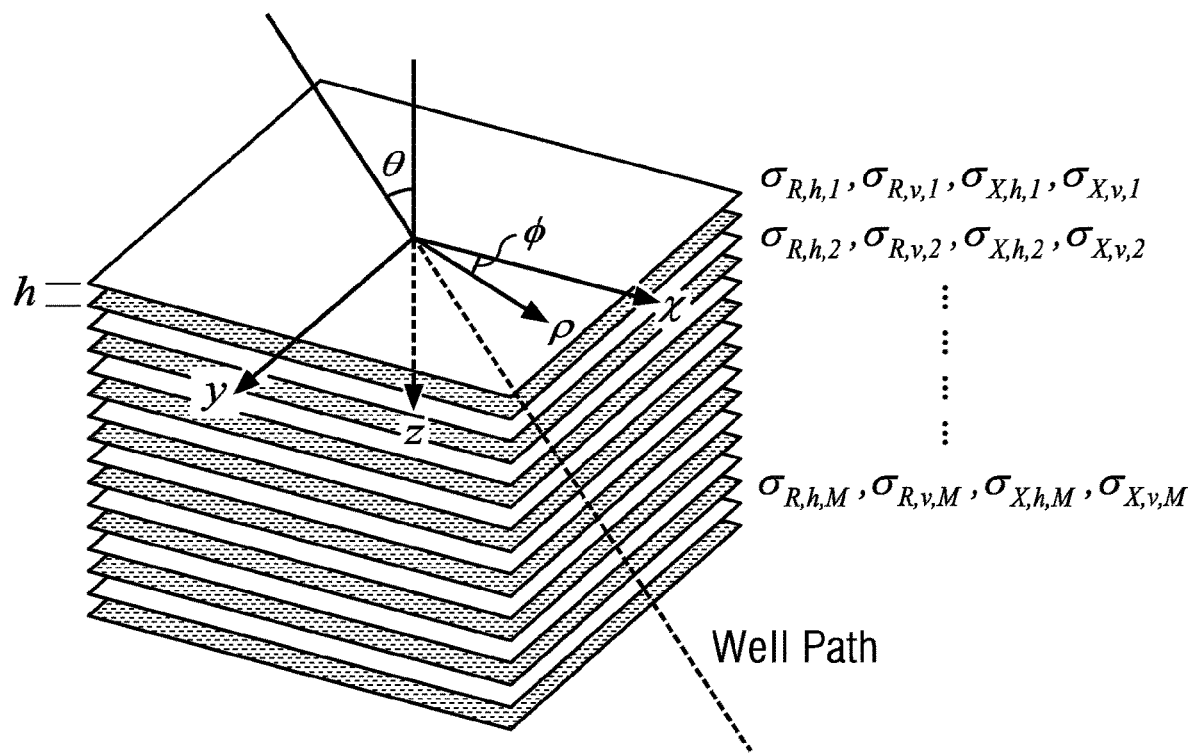
FIG. 3 depicts a schematic diagram of a one-dimensional (1D) formation model utilized in the disclosed methods. In this model the anisotropic, real conductivities $\sigma_{R,h}$ and $\sigma_{R,v}$ and the anisotropic, imaginary conductivities $\sigma_{X,h}$ and $\sigma_{X,v}$ may change in the z-direction (e.g., layer by layer), but are invariant in both the x- and y-directions. Angles $\theta$ and $\phi$ are the relative dip and azimuth of the well path.

The disclosed embodiments are intended to compute real and imaginary anisotropic conductivities of a subterranean formation via inverting propagation measurements that are sensitive to anisotropy (e.g., using a tool including a transverse coupling or a cross coupling such as one of the propagation tools described above with respect to FIGS. 1 and 2). In the inversion, the formation model includes a layered structure where conductivity and dielectric constant vary in one direction only, designated as the z-direction as shown in FIG. 3. The cost function that the inversion minimizes is given by:

$$\mathcal{L}(\sigma_{R,h}, \sigma_{R,v}, \sigma_{X,h}, \sigma_{X,v}, \theta, \phi) = \tag{5}$$
$$\chi^2(\sigma_{R,h}, \sigma_{R,v}, \sigma_{X,h}, \sigma_{X,v}, \theta, \phi) + \gamma_S \mathcal{L}_S(\sigma_{R,h}, \sigma_{R,v}, \sigma_{X,h}, \sigma_{X,v})$$

where:

$$\chi^2(\sigma_{R,h}, \sigma_{R,v}, \sigma_{X,h}, \sigma_{X,v}, \theta, \phi) = \tag{6}$$
$$\int_{-\infty}^{\infty} dZ \sum_{jk} \left\{ \left[ \frac{d_R^{jk}(z', \sigma_{R,h}, \sigma_{R,v}, \sigma_{X,h}, \sigma_{X,v}, \theta, \phi) - d_R^{jk,OBS}(z)}{\Delta_R^{jk}} \right]^2 + \left[ \frac{d_X^{jk}(z, \sigma_{R,h}, \sigma_{R,v}, \sigma_{X,h}, \sigma_{X,v}, \theta, \phi) - d_X^{jk,OBS}(z)}{\Delta_X^{jk}} \right]^2 \right\}$$

$$\mathcal{L}_S(\sigma_{R,h}, \sigma_{R,v}, \sigma_{X,h}, \sigma_{X,v}) = \tag{7}$$
$$\mu_h \left\{ \int_{-\infty}^{\infty} dz \left[ \frac{d\sigma_{R,h}(z)}{dz} \right]^2 + \int_{-\infty}^{\infty} dz \left[ \frac{d\sigma_{X,h}(z)}{dz} \right]^2 \right\} + \mu_v \left\{ \int_{-\infty}^{\infty} dz \left[ \frac{d\sigma_{R,v}(z)}{dz} \right]^2 + \int_{-\infty}^{\infty} dz \left[ \frac{d\sigma_{X,v}(z)}{dz} \right]^2 \right\}$$

where $\sigma_{R,h}$, $\sigma_{R,v}$, $\sigma_{X,h}$ and $\sigma_{X,v}$ represent real horizontal conductivity, real vertical conductivity, imaginary horizontal conductivity, and imaginary vertical conductivity of the formation to be determined via inversion. The first term on the right-hand side of Eq. (5) (the misfit $\chi^2$) describes how well the simulated data matches the measured data. Here, $d_R^{jk,OBS}$ and $d_X^{jk,OBS}$ represent the measured attenuation and phase shift (of the electromagnetic propagation measurements). The indices j,k in the superscript indicate the particular spacing along the tool and the coupling components at each measured depth. The simulated measurements $d_R^{jk}$ and $d_X^{jk}$ correspond to the measured attenuation and phase shift values $d_R^{jk,OBS}$ and $d_X^{jk,OBS}$. The simulated measurements $d_R^{jk}$ and $d_X^{jk}$ may be obtained rapidly, for example, with a fast forward solver for the above described 1D formation (FIG. 3). With continued reference to Eq. (6), $\Delta_R^{jk}$ and $\Delta_X^{jk}$ represent standard deviations of the attenuation and phase shift. If each datum is an independent random variable, the summation of the squared differences in Eq. (6) obeys a $\chi^2$ distribution.

The second term of Eq. (5) is given in Eq. (7), which is a smoothness term that guides the inversion to preferentially look for a smooth model among all feasible solutions. It is referred to as the smoothness term henceforth and includes a regularization coefficient $\gamma_S$ and a smoothness operator $\mathcal{L}_S$ that is related to $\sigma_{R,h}$, $\sigma_{R,v}$, $\sigma_{X,h}$ and $\sigma_{X,v}$. The horizontal and vertical relaxation coefficients $\mu_h$ and $\mu_v$ on the right-hand side of Eq. (7) may be thought of as weighting factors and are intended to account for the above described sensitivity difference of the measurement to the horizontal real and imaginary conductivities and the vertical real and imaginary conductivities. The horizontal relaxation coefficient $\mu_h$ is multiplied by a horizontal smoothness operator that is related to $\sigma_{R,h}$ and $\sigma_{X,h}$ and the vertical relaxation coefficient $\mu_v$ is multiplied by a vertical smoothness operator that is related to $\sigma_{R,v}$ and $\sigma_{X,v}$.

For numerical implementations, the cost function of Eq. (5) may be discretized, yielding:

$$\mathcal{L}(m, \theta, \phi) = \chi^2(m, \theta, \phi) + \gamma_S \mathcal{L}_S(m) \tag{8}$$

where $$m \equiv \begin{pmatrix} m_{R,h}^T & m_{R,v}^T & m_{X,h}^T & m_{X,v}^T \end{pmatrix} \tag{9}$$

In Eq. (9), $m_{R,h}$, $m_{R,v}$, $m_{X,h}$, and $m_{X,v}$ represent four N-dimensional vectors of the conductivities of the truncated solution domain $[z_L, z_U]$ after being subdivided into N slabs or pixels with equal thickness, identified by h as shown in FIG. 3. The superscript T designates the operation of matrix transposition. The four vectors are given by:

$$m_{R,h} = (\sigma_{R,h,1}, \sigma_{R,h,2}, \cdots, \sigma_{R,h,N})^T \tag{10a}$$
$$m_{R,v} = (\sigma_{R,v,1}, \sigma_{R,v,2}, \cdots, \sigma_{R,v,N})^T \tag{10b}$$
$$m_{X,h} = (\sigma_{X,h,1}, \sigma_{X,h,2}, \cdots, \sigma_{X,h,N})^T \tag{11a}$$
$$m_{X,v} = (\sigma_{X,v,1}, \sigma_{X,v,2}, \cdots, \sigma_{X,v,N})^T \tag{11b}$$

The discrete forms of the two terms in Eq. (8) are respectively:

$$\chi^2(m, \theta, \phi) = \tag{12}$$
$$\left\| \overline{W}_R \left[ d_R(m, \theta, \phi) - d_R^{OBS} \right] \right\|_2^2 + \left\| \overline{W}_X \left[ d_X(m, \theta, \phi) - d_X^{OBS} \right] \right\|_2^2$$

$$\mathcal{L}_S(m) = \mu_h \{ \|\overline{D}m_{R,h}\|_2^2 + \|\overline{D}m_{X,h}\|_2^2 \} + \mu_v \{ \|\overline{D}m_{R,v}\|_2^2 + \|\overline{D}m_{X,v}\|_2^2 \} \tag{13}$$

In Eq. (12), $d_R^{OBS}$ and $d_X^{OBS}$ represent electromagnetic measurements acquired at all depth points in the truncated domain $[z_L, z_U]$ and at multiple spacings and couplings on the propagation tool at each depth point. The total number of measurements is P for both $d_R^{OBS}$ and $d_X^{OBS}$ in which P=MQ, where M is the number of logging points and Q is the number of measurements made at each logging point. To ensure adequate sensitivity to both vertical and horizontal conductivities and vertical and horizontal dielectric constants, the use of data from different couplings between transmitters and receivers may be advantageous. Moreover, the use of data from more than one spacing may be helpful to make the inversion more robust. These multiple measurements may be given as follows:

$$d_R^{OBS} = \begin{pmatrix} d_{R,1}^{OBS} & d_{R,2}^{OBS} & \cdots & d_{R,P}^{OBS} \end{pmatrix}^T \quad (14)$$

$$d_X^{OBS} = \begin{pmatrix} d_{X,1}^{OBS} & d_{X,2}^{OBS} & \cdots & d_{X,P}^{OBS} \end{pmatrix}^T \quad (15)$$

where $d_R$ and $d_X$ represent phase shift and attenuation of propagation logging at the same depth points, spacings, and couplings:

$$d_R(m) = [d_{R,1}(m) \quad d_{R,2}(m) \quad \ldots \quad d_{R,P}(m)]^T \quad (16)$$

$$d_X(m) = [d_{X,1}(m) \quad d_{X,2}(m) \quad \ldots \quad d_{X,P}(m)]^T \quad (17)$$

In Eq. (12), matrices $\overline{W}_R$ and $\overline{W}_X$ are diagonal matrices containing the inverses of standard deviations of the noises of the phase shift and attenuation measurements:

$$\overline{W}_R = \mathrm{diag}\begin{pmatrix} \Delta_{R,1}^{-1} & \Delta_{R,2}^{-1} & \ldots & \Delta_{R,P}^{-1} \end{pmatrix} \quad (18)$$

$$\overline{W}_X = \mathrm{diag}\begin{pmatrix} \Delta_{X,1}^{-1} & \Delta_{X,2}^{-1} & \ldots & \Delta_{X,P}^{-1} \end{pmatrix} \quad (19)$$

Matrix $\overline{D} \in R^{(N-1) \times N}$ in Eq. (13) is a difference operator, $$\overline{D} = \begin{pmatrix} -1 & 1 & & \\ & -1 & 1 & \\ & & & \\ & & -1 & 1 \end{pmatrix} \quad (20)$$

Different methods may be used to minimize the discretized cost function in Eq. (8). For example, without a loss of generality, a Gauss-Newton method may be used to find the best-fit solution for the four conductivity models $m_{R,h}$, $m_{R,v}$, $m_{X,h}$, and $m_{X,v}$. For the sake of concise formulation:

$$d \equiv (d_R^T \quad d_X^T)^T \quad (21)$$

$$d^{OBS} \equiv \left[ (d_R^{OBS})^T \quad (d_X^{OBS})^T \right]^T \quad (22)$$

$$\overline{W}_D = \begin{pmatrix} \overline{W}_R & \overline{0} \\ \overline{0} & \overline{W}_X \end{pmatrix} \quad (23)$$

In Eq. (23), $\overline{0} \in R^{P \times P}$ is a zero matrix. Suppose the current iterative step is l, then the solution at this step is $$m_l = m_{l-1} + v_{l-1} q_{l-1} \quad (24)$$

where $q_{l-1}$ is the Newton search direction; $V_{l-1}$ is the step length to reduce the effect of approximation error caused by the quadratic approximation at the current step. The search vector may be expressed as follows:

$$q_{l-1} = -\overline{G}_{l-1}^{-1} g_{l-1} \quad (25)$$

where $g_{l-1}$ represents the gradient of the cost function and $\overline{G}_{l-1}$ represents its Hessian. The gradient and Hessian may be given as follows:

$$g_{l-1} = J_{l-1}^t \overline{W}_D^t \overline{W}_D (d_{l-1} - d^{OBS}) + \gamma_S^{l-1} \nabla \mathcal{L}_S(m_{l-1}) \quad (26)$$

$$\overline{G}_{l-1} = J_{l-1}^t \overline{W}_D^t \overline{W}_D J_{l-1} + \gamma_S^{l-1} \nabla \nabla \mathcal{L}_S(m_{l-1}) \quad (27)$$

In Eqs. (26) and (27), $d_{l-1}$ represents simulated data corresponding to the model $m_{l-1}$ obtained at the previous step; $J_{l-1}$ is the Jacobian of the data term $\chi^2$ of the cost function, evaluated at $m=m_{l-1}$. $\nabla \mathcal{L}_S$ is the gradient of the smoothness term in Eq. (5). $\nabla \nabla \mathcal{L}_S$ is its Hessian. The exact forms of the gradient and Hessian are readily derived from $\mathcal{L}_S$ in Eq. (13).

Eqs. (24) through (27) show that Newton search direction $q_{l-1}$ is dependent on the regularization coefficient $\gamma_S$. The selection of $\gamma_S$ may therefore have a strong influence on the final solution to m. In example embodiments, the regularization coefficient $\gamma_S$ may advantageously be selected using the following minimization method:

$$\gamma_S^{l-1} = \arg\min_{\gamma_S} \chi^2 [m_{l-1} + v_{l-1} q_{l-1}(\gamma_s)] \quad (28)$$

where $\chi^2[m_{l-1} + v_{l-1} q_{l-1}(\gamma_s)]$ represents the data misfit evaluated for the selected $\gamma_s$. It will be appreciated that finding a suitable (or optimal) regularization coefficient $\gamma_S$ at each step, may require Eq. (28) to be solved at each iteration including a line search to determine the step length $v_{l-1}$. While this approach requires additional processing, the resulting regularization coefficient $\gamma_S$ tends to advantageously provide a model that both provides a best fit of the data and is minimally influenced by data noise.

With reference to Eqs. (26), and (27), Jacobian $J_{l-1} \in R^{2P \times 4N}$ contains the first derivatives of $d_R$ and $d_X$ with respect to four pixel conductivities, evaluated at $m=m_{l-1}$. The Jacobian is given by $$J_{l-1} = \begin{pmatrix} \frac{\partial d_R}{\partial m_{R,h}} & \frac{\partial d_R}{\partial m_{R,v}} & \frac{\partial d_R}{\partial m_{X,h}} & \frac{\partial d_R}{\partial m_{X,v}} \\ \frac{\partial d_X}{\partial m_{R,h}} & \frac{\partial d_X}{\partial m_{R,v}} & \frac{\partial d_X}{\partial m_{X,h}} & \frac{\partial d_X}{\partial m_{X,v}} \end{pmatrix}\Bigg|_{m=m_{l-1}} \quad (29)$$

where

-continued $$\frac{\partial d_\eta}{\partial x} = \begin{pmatrix} \frac{\partial d_{\eta,1}}{\partial x_1} & \frac{\partial d_{\eta,1}}{\partial x_2} & \cdots & \frac{\partial d_{\eta,1}}{\partial x_N} \\ \frac{\partial d_{\eta,2}}{\partial x_1} & \frac{\partial d_{\eta,2}}{\partial x_2} & \cdots & \frac{\partial d_{\eta,2}}{\partial x_N} \\ \vdots & \vdots & \ddots & \vdots \\ \frac{\partial d_{\eta,M}}{\partial x_1} & \frac{\partial d_{\eta,M}}{\partial x_2} & \cdots & \frac{\partial d_{\eta,M}}{\partial x_N} \end{pmatrix}, \quad (30)$$

$$\eta = R, X; \; x = m_{R,h}, m_{R,v}, m_{X,h}, m_{X,v}$$

Derivatives of $d_R$ and $d_X$ with respect to real horizontal and vertical conductivities of pixels may be computed either with an analytical approach or using a finite difference approximation. Instead of computing them directly, derivatives with respect to imaginary horizontal and vertical conductivities are derived from those with respect to two real conductivities. Making using of the Born's approximation, we obtain the following relationships:

$$\frac{\partial d_{R,j}}{\partial \sigma_{X,\zeta,k}} = \frac{\partial d_{X,j}}{\partial \sigma_{R,\zeta,k}}, \; \zeta = h, v \quad (31)$$

$$\frac{\partial d_{X,j}}{\partial \sigma_{X,\zeta,k}} = -\frac{\partial d_{R,j}}{\partial \sigma_{R,\zeta,k}}, \; \zeta = h, v \quad (32)$$

for the j-th phase shift and attenuation measurements (of the propagation logging measurements). The conductivities $\sigma_{R,\zeta,k}$ and $\sigma_{X,\zeta,k}$, $\zeta=h,v$ are those of pixel k. For a coaxial propagation tool including one transmitter T and two receivers R1 and R2, $d_{PS}=\mathrm{Im}\{\ln(V_1/V_2)\}$ and $d_{AT}=\mathrm{Re}\{\ln(V_1/V_2)\}$. Here, $V_1$ and $V_2$ are voltages at the near receiver R1 and far receiver R2 induced by the transmitter T. Eqs. (31) and (32) can be written in vector form, for example, as follows:

$$\frac{\partial d_R}{\partial m_{X,\zeta}} = \frac{\partial d_X}{\partial m_{R,\zeta}}, \; \zeta = h, v \quad (33)$$

$$\frac{\partial d_X}{\partial m_{X,\zeta}} = -\frac{\partial d_R}{\partial m_{R,\zeta}}, \; \zeta = h, v \quad (34)$$

Substituting Eqs. (33) and (34) into the Jacobian given in Eq. (29) yields the following:

$$\mathcal{J}_{l-1} = \begin{pmatrix} \frac{\partial d_R}{\partial m_{R,h}} & \frac{\partial d_R}{\partial m_{R,v}} & \frac{\partial d_X}{\partial m_{R,h}} & \frac{\partial d_X}{\partial m_{R,v}} \\ \frac{\partial d_X}{\partial m_{R,h}} & \frac{\partial d_X}{\partial m_{R,v}} & -\frac{\partial d_R}{\partial m_{R,h}} & -\frac{\partial d_R}{\partial m_{R,v}} \end{pmatrix}_{m=m_{l-1}} \quad (35)$$

It will be appreciated that the use of the Jacobian in Eq. (35) may expedite the inversion by nearly a factor of two compared to using the Jacobian in Eq. (29).

With reference again to the discretized cost function described above with respect to Eqs. (5) through (13), the parameters $\mu_h$ and $\mu_v$ in Eq. (13) are used to account for a difference in measurement sensitivity to the horizontal components $\sigma_{R,h}$ and $\sigma_{X,h}$, and vertical components $\sigma_{R,v}$ and $\sigma_{X,v}$. In many practical implementations, the sensitivity of the electromagnetic measurements to $\sigma_{R,h}$ and $\sigma_{X,h}$ is larger than that to $\sigma_{R,v}$ and $\sigma_{X,v}$. As a result, using the same regularization coefficient $\gamma_S$ for each sub-term in the smoothness term $\mathcal{L}_S$ may cause an over-smoothed $\sigma_{R,v}$ and $\sigma_{X,v}$ having limited (or even poor) resolution. This undesirable partial over-smoothing effect may be alleviated by using horizontal and vertical relaxation coefficients $\mu_h$ and $\mu_v$ that weight the regularization coefficient. The relaxation coefficients may be defined, for example, such that the sensitivity of the measurements to a given parameter from the smoothness term $\mathcal{L}_S$ is proportional to that from the data term $\chi^2$ in Eq. (5). In many practical implementations it can be advantageous to set $\mu_v$ to a value that is less than $\mu_h$. For example, in some embodiments it may be advantageous to select a value of $\mu_v$ that is a range from 0.01 to 0.5 (i.e., from 1% to 50%) of that of $\mu_h$. For example, $\mu_h$ may be set equal to 1 and $\mu_v$ may be set equal to 0.1.

In another example implementation, the relaxation coefficient $\mu_h$ for the horizontal components $\sigma_{R,h}$ and $\sigma_{X,h}$ may be set equal to 1, e.g., such that $\mu_h^{l-1}=1$. The relaxation coefficient $\mu_v$ for the vertical components $\sigma_{R,v}$ and $\sigma_{X,v}$ may be computed at each iteration of the inversion, for example, as follows (and as described below with respect to FIG. 4B):

$$\mu_v^{l-1} = \left(\frac{tr(\nabla\nabla \mathcal{L}_{S,h}^{l-1})}{tr(\nabla\nabla \mathcal{L}_{S,v}^{l-1})}\right) \bigg/ \left(\frac{tr(\nabla\nabla \chi_h^{2,l-1})}{tr(\nabla\nabla \chi_v^{2,l-1})}\right). \quad (36)$$

In the above expression, $\mathcal{L}_{S,h}^{l-1}$ and $\mathcal{L}_{S,v}^{l-1}$ represent the first and second terms of $\mathcal{L}_S$ respectively, evaluated at $m=m_{l-1}$. $\nabla\nabla \mathcal{L}_{S,h}^{l-1}$ and $\nabla\nabla \mathcal{L}_{S,v}^{l-1}$ represent the Hessians of $\mathcal{L}_S$ with respect to the horizontal components $\sigma_{R,h}$ and $\sigma_{X,h}$ and the vertical components $\sigma_{R,v}$ and $\sigma_{X,v}$, respectively. $\nabla\nabla \chi_h^{2,l-1}$ and $\nabla\nabla \chi_v^{2,l-1}$ represent the Hessians of the data term $\chi^2$ with respect, to the horizontal components $\sigma_{R,h}$ and $\sigma_{X,h}$ and the vertical components $\sigma_{R,v}$ and $\sigma_{X,v}$, respectively. The four Hessians may be evaluated at $m=m_{l-1}$. The operator $tr(\cdot)$ in Eq. (36) gives the trace of a matrix. A rigorous computation of the two Hessian matrices of the data term may be prohibitively expensive (computationally). In certain embodiments (e.g., in which computational resources are limited), the following approximations for the two Hessians may be used:

$$\nabla\nabla \chi_h^{2,l-1} \approx \mathcal{J}_{l-1,h}^t \overline{W}_D^t \overline{W}_D \mathcal{J}_{l-1,h}, \quad (37)$$

$$\nabla\nabla \chi_v^{2,l-1} \approx \mathcal{J}_{l-1,v}^t \overline{W}_D^t \overline{W}_D \mathcal{J}_{l-1,v}. \quad (38)$$

In the above, $\mathcal{J}_{l-1,h}$ and $\mathcal{J}_{l-1,v}$ represent Jacobians with respect to $m_h=(m_{R,h}^T, m_{X,h}^T)^T$ and $m_v=(m_{R,v}^T, m_{X,v}^T)^T$, respectively.

The stopping criteria for the inversion may be $\chi^2 < M_f$ and $l > l_{max}$, where l is the index for the iteration step (such that $l=1, 2, \ldots, l_{max}$). $M_f$ is the number of degrees of freedom, $M_f=2M$ if all data are independent random variables. In the inversion the maximum number of iterations, $l_{max}$, is set to 50.

Figure 4A:
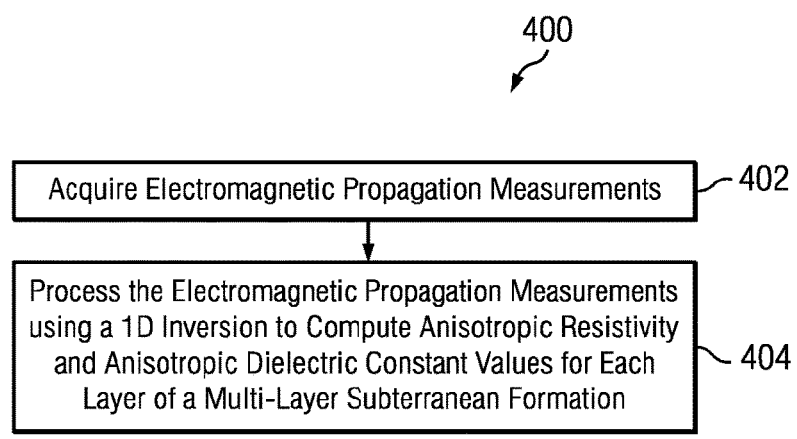
FIG. 4A depicts a flowchart of one example method embodiment for estimating resistivity and dielectric constant values of a multi-layer subterranean formation.
Figure 4B:
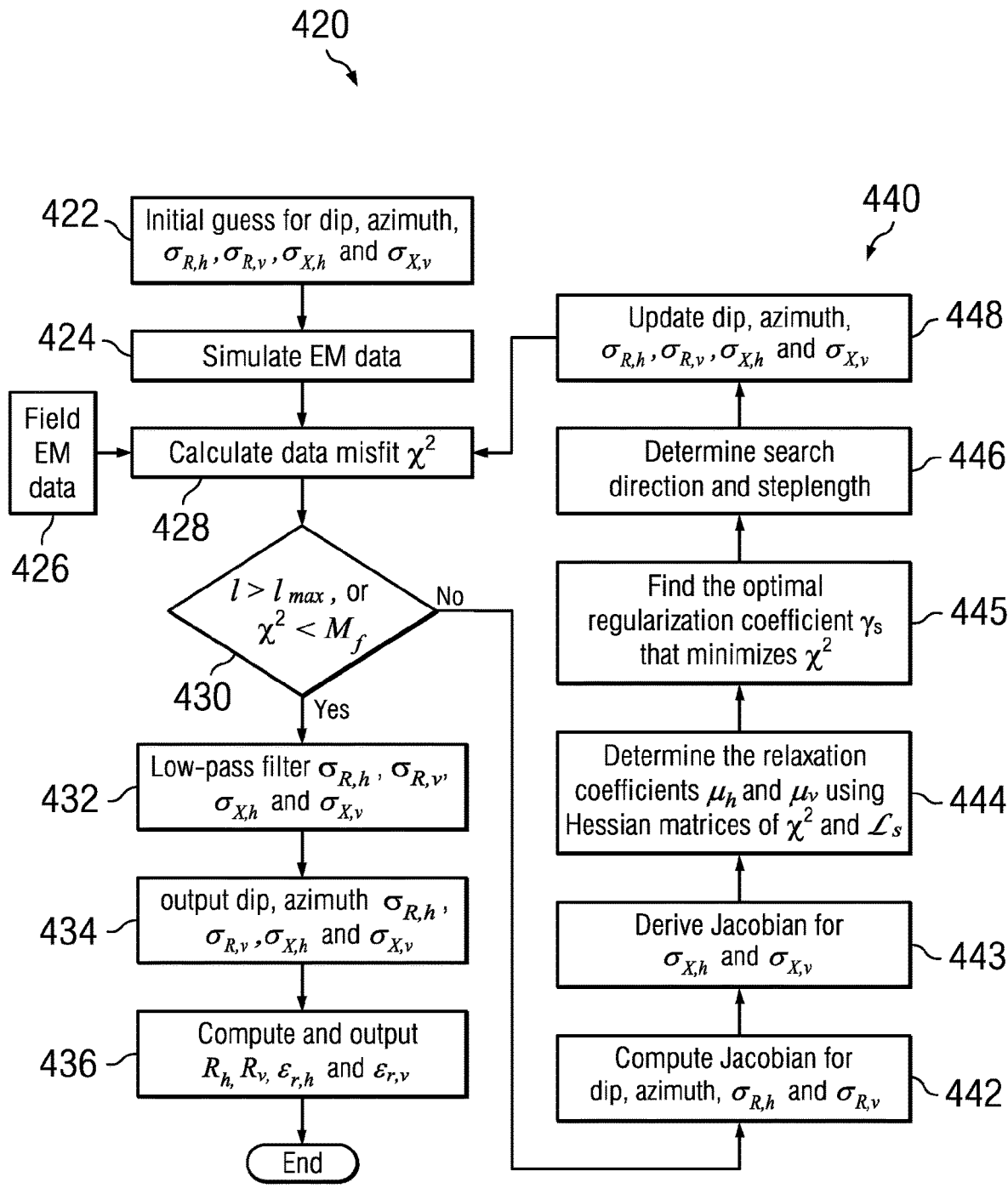
FIG. 4B depicts a flowchart of another example method embodiment for estimating resistivity and dielectric constant values of a multi-layer subterranean formation.

FIGS. 4A and 4B (collectively FIG. 4) depicts flow charts of example method embodiments for estimating anisotropic resistivity and dielectric constant of a subterranean formation. In method 400 shown on FIG. 4A, electromagnetic propagation measurements are received at 402. The measurements may be received, for example, from an electromagnetic propagation tool that was used to make the measurements while translating along an axis of a subterranean wellbore. The received measurements may include propagation measurements made at a plurality of transmitter receiver spacings at each of a plurality of measured depths in the wellbore. The received measurements are processed at 404 via an inversion algorithm using a one-dimensional formation model including a plurality of formation layers to compute anisotropic resistivity and anisotropic dielectric constant values for each of the plurality of formation layers to compute vertical and horizontal resistivity and vertical and horizontal dielectric constant values corresponding to each of the formation layers in the model.

FIG. 4B depicts a more detailed flow chart of an example method 420. The method 420 includes providing or making initial guesses (estimates) of dip, azimuth, and the anisotropic real and imaginary conductivity values (i.e., the real and imaginary vertical and horizontal conductivity values) at 422. The initial guesses are processed at 424 to simulate electromagnetic propagation measurements, for example, using a fast, forward solver based on the formation model depicted on FIG. 3. The simulated measurements are processed at 428 in combination with actual propagation measurements (made and/or received at 426) to compute a cost function $\mathcal{L}$ that is related to the misfit $\chi^2$ between the actual and simulated measurements (e.g., via Equation 11).

The method evaluates predetermined stopping criteria at 430 (e.g., the cost function $\mathcal{L}$ being less than a threshold as described above). When the stopping criteria are not satisfied, a processing loop 440 computes updated (new) dip, azimuth, real horizontal and vertical conductivity and imaginary horizontal and vertical conductivity values at 448. The processing loop 440 may include computing a Jacobian based on the most recent dip, azimuth, and real horizontal and vertical conductivity values at 442 and deriving the Jacobian for the imaginary horizontal and vertical conductivity values at 444. The processing loop further includes determining horizontal and vertical relaxation coefficients at 444, for example, using Hessian matrices as described above with respect to Eqs. 36 through 38 and finding an optimal regularization coefficient at 445, for example, as described above with respect to Eq. 28. A search direction and step length may then be determined at 446 based on the optimal regularization coefficient. The dip, azimuth, and the anisotropic real and imaginary conductivity values are then updated at 448.

With continued reference to FIG. 4B, a low pass filter may be applied to the most recent anisotropic real and imaginary conductivity values at 432 to obtain filtered values at 4344 when the stopping criteria are satisfied at 430. These filtered values may also be output along with the dip and azimuth at 434. The filtered values may then be processed at 436 to compute and output vertical and horizontal resistivity and vertical and horizontal dielectric constant values of the subterranean formation.

In practice, some variants may be derived from the inversion process described above to further enhance the performance of the inversion. For example, the smoothness term in Eq. (13) may be modified as follows:

$$\mathcal{L}_S(\sigma_{R,h}, \sigma_{R,v}, \sigma_{X,h}, \sigma_{X,v}) = \\ \mu_h \left\{ \int_{-\infty}^{\infty} dz \left[ \frac{d\ln\sigma_{R,h}(z)}{dz} \right]^2 + \int_{-\infty}^{\infty} dz \left[ \frac{d\ln\sigma_{X,h}(z)}{dz} \right]^2 \right\} + \\ \mu_v \left\{ \int_{-\infty}^{\infty} dz \left[ \frac{d\ln\sigma_{R,v}(z)}{dz} \right]^2 + \int_{-\infty}^{\infty} dz \left[ \frac{d\ln\sigma_{X,v}(z)}{dz} \right]^2 \right\}. \tag{39}$$

Note that in this variant, the smoothness term $\mathcal{L}_S$ is computed using derivatives of the natural logarithms of the horizontal and vertical conductivities.

To facilitate numerical implementation, if a measurement zone to be processed is long, the zone may first be subdivided into a sequence of short intervals. The inversion may then be run on each interval separately. The results of the intervals may then be combined to obtain a single output (e.g., a log of anisotropic resistivity and anisotropic dielectric constant). One realization of this divide and conquer scheme is: each interval is 30 feet (10 meters) with a transition zone of 25 feet (8 meters) on both sides. The relative dip θ, or the angle made by the tool axis and the normal to the bedding planes is assumed to be already known and therefore is fixed in the inversion. It can be obtained with borehole image data or some advanced electromagnetic measurements, e.g. Periscope data.

As noted above with respect to FIG. 4B, the conductivity values that are obtained at the last iteration of the inversion may be low-pass filtered to remove undesirable spikes before being used as the final solution. In one embodiment a Gaussian filter with a standard deviation of 0.35 feet (0.1 meter) may be used. The resistivity may also be provided as a reciprocal of the filtered conductivity, for example, as described above. The output anisotropic conductivity values and/or anisotropic resistivity and dielectric constant values are intended to reflect the collective effect of formation and conductive additions such as metallic particles and to give a representative formation resistivity and dielectric constant free of bed boundary and dipping effects up to the tool resolution. Moreover, there tends to be no skin effect or distortion caused by the dielectric constant, which are already corrected in the inversion together with the bed boundary and dipping effects.

It will be appreciated that the disclosed embodiments may further include a system for estimating anisotropic resistivity and dielectric constant values of a subterranean formation. Such a system may include computer hardware and software configured to execute the above described inversion processing. The system may further include an electromagnetic logging tool configured to make electromagnetic propagation measurements in a wellbore. The hardware may include one or more processors (e.g., microprocessors) which may be connected to one or more data storage devices (e.g., hard drives or solid state memory) and user interfaces. The hardware and software may be configured to execute the inversion, for example, as described above. It will be further understood that the disclosed embodiments may include processor executable instructions stored in the data storage device. The disclosed embodiments are, of course, not limited to the use of or the configuration of any particular computer hardware and/or software.

It will be understood that the present disclosure includes numerous embodiments. These embodiments include, but are not limited to, the following embodiments.

In a first embodiment, a method for estimating anisotropic resistivity and anisotropic dielectric constant of a subterranean formation includes acquiring electromagnetic propagation measurements made in a wellbore penetrating the subterranean formation; compute simulated propagation measurements using a model, the model including a one-dimensional formation model having a plurality of formation layers, each of the plurality of formation layers including an anisotropic resistivity and an anisotropic dielectric constant; and iteratively updating the model with new values of the anisotropic resistivity and the anisotropic dielectric constant until a cost function is less than a threshold to compute vertical and horizontal resistivity values and vertical and horizontal dielectric constant values of each of the plurality of formation layers.

A second embodiment may include the first embodiment wherein the cost function includes a misfit term and a smoothness term, the smoothness term including a product of a regularization coefficient and a smoothness operator; and the iteratively updating the model further includes selecting a value of the regularization coefficient that minimizes the misfit term of the cost function.

A third embodiment may include any one of the first through second embodiments, wherein the cost function includes a misfit term and a smoothness term, the smoothness term including a product of a regularization coefficient and a smoothness operator; the smoothness operator includes a first term including a product of a horizontal relaxation coefficient and a horizontal smoothness operator and a second term including a product of a vertical relaxation coefficient and a vertical smoothness operator; and the horizontal relaxation coefficient is not equal to the vertical relaxation coefficient.

A fourth embodiment may include the third embodiment, wherein the vertical relaxation coefficient is set to a value that is in a range from 1 percent to 50 percent of a value of the horizontal relaxation coefficient.

A fifth embodiment may include any one of the first through fourth embodiments, wherein the cost function includes a misfit term and a smoothness term, the smoothness term including a product of a regularization coefficient and a smoothness operator; the smoothness operator includes a first term including a product of a horizontal relaxation coefficient and a horizontal smoothness operator and a second term including a product of a vertical relaxation coefficient and a vertical smoothness operator; and the iteratively updating the model further includes computing an updated value for at least one of the horizontal relaxation coefficient and the vertical relaxation coefficient.

A sixth embodiment may include the fifth embodiment, wherein the computing an updated value for at least one of the horizontal relaxation coefficient and the vertical relaxation coefficient comprises computing a first ratio of a trace of a Hessian matrix of the horizontal smoothness operator and a trace of a Hessian matrix of the vertical smoothness operator and a second ratio of ratio of a trace of a Hessian matrix of the a horizontal data misfit and a trace of a Hessian matrix of a vertical data misfit.

A seventh embodiment may include the sixth embodiment, wherein the updated value for the at least one of the horizontal relaxation coefficient and the vertical relaxation coefficient is equal to a third ratio of the first ratio and the second ratio.

An eighth embodiment may include any one of the first through seventh embodiments, wherein iteratively updating the model further includes (i) computing a Jacobian for dip, azimuth, and the anisotropic resistivity and (ii) deriving the Jacobian for the anisotropic dielectric constant.

A ninth embodiment may include any one of the first through eighth embodiments, wherein the acquiring electromagnetic propagation measurements comprises: translating the electromagnetic propagation tool along an axis of the wellbore; and causing the electromagnetic propagation tool to make a plurality of electromagnetic measurements using transmitter receiver couplings that have a plurality of spacings at a plurality of measured depths while translating in the wellbore.

A tenth embodiment may include any one of the first through ninth embodiments, wherein the cost function is a discretized relation depending on the vertical and horizontal resistivity values and the vertical and horizontal dielectric constant values of each of the plurality of formation layers.

An eleventh embodiment may include any one of the first through tenth embodiments, wherein the iteratively updating the model comprises using a Gauss-Newton method to iteratively determine vertical and horizontal resistivity values and the vertical and horizontal dielectric constant values of each of the plurality of formation layers.

A twelfth embodiment may include any one of the first through eleventh embodiments, wherein the electromagnetic propagation measurements comprise attenuation and phase shift measurements made at one or more frequencies in a range from 1 kHz to 10 MHz.

In a thirteenth embodiment, a method for estimating anisotropic resistivity and dielectric constant values of a subterranean formation includes: acquiring electromagnetic propagation measurements made in a wellbore penetrating the subterranean formation, the electromagnetic propagation measurements including measurements made at a plurality of measured depths in the wellbore and with a transmitter receiver couplings having a plurality of spacings along an electromagnetic propagation logging tool; and inverting the electromagnetic propagation measurements using a one-dimensional formation model including a plurality of formation layers to compute vertical and horizontal resistivity values and vertical and horizontal dielectric constant values of each of the plurality of formation layers.

A fourteenth embodiment may include the thirteenth embodiment, wherein the inverting comprises selecting the vertical and horizontal resistivity values and the vertical and horizontal dielectric constant values to minimize a cost function, the cost function including a misfit term and a smoothness term, the smoothness term including a product of a regularization coefficient and a smoothness operator; and the inverting further comprises iteratively selecting a regularization coefficient that minimizes the misfit term of the cost function.

A fifteenth embodiment may include any one of the thirteenth through fourteenth embodiments, wherein the inverting comprises selecting the vertical and horizontal resistivity values and the vertical and horizontal dielectric constant values to minimize a cost function, the cost function including a misfit term and a smoothness term, the smoothness term including a product of a regularization coefficient and a smoothness operator; the smoothness operator including a first term including a product of a horizontal relaxation coefficient and a horizontal smoothness operator and a second term including a product of a vertical relaxation coefficient and a vertical smoothness operator; and the vertical relaxation coefficient is set to a value that is in a range from 1 percent to 50 percent of a value of the horizontal relaxation coefficient.

A sixteenth embodiment may include any one of the thirteenth through fifteenth embodiments, wherein the inverting comprises selecting the vertical and horizontal resistivity values and the vertical and horizontal dielectric constant values to minimize a cost function, the cost function including a misfit term and a smoothness term, the smoothness term including a product of a regularization coefficient and a smoothness operator; the smoothness operator including a first term including a product of a horizontal relaxation coefficient and a horizontal smoothness operator and a second term including a product of a vertical relaxation coefficient and a vertical smoothness operator; and the inverting further includes iteratively computing an updated value for at least one of the horizontal relaxation coefficient and the vertical relaxation coefficient.

A seventeenth embodiment may include the sixteenth embodiment, wherein the computing an updated value for at least one of the horizontal relaxation coefficient and the vertical relaxation coefficient comprises computing a first ratio of a trace of a Hessian matrix of the horizontal smoothness operator and a trace of a Hessian matrix of the vertical smoothness operator and a second ratio of ratio of a trace of a Hessian matrix of the a horizontal data misfit and a trace of a Hessian matrix of a vertical data misfit.

In an eighteenth embodiment, a system includes a downhole electromagnetic logging tool configured to make a plurality of electromagnetic propagation measurements of a subterranean formation; a processor; and memory storing instructions configured to be executed by the processor, the instructions comprising instructions to: acquire electromagnetic propagation measurements made in a wellbore penetrating the subterranean formation; compute simulated propagation measurements using a one-dimensional formation model including a plurality of formation layers, each of the plurality of formation layers including an anisotropic resistivity and an anisotropic dielectric constant; and iteratively update the model with new values of the anisotropic resistivity and the anisotropic dielectric constant until a cost function is less than a threshold to compute vertical and horizontal resistivity values and vertical and horizontal dielectric constant values for each of the plurality of formation layers.

A nineteenth embodiment may include the eighteenth embodiment, wherein the cost function includes a misfit term and a smoothness term, the smoothness term including a product of a regularization coefficient and a smoothness operator, the smoothness operator including a first term including a product of a horizontal relaxation coefficient and a horizontal smoothness operator and a second term including a product of a vertical relaxation coefficient and a vertical smoothness operator; and the vertical relaxation coefficient is set to a value that is in a range from 1 percent to 50 percent of a value of the horizontal relaxation coefficient.

A twentieth embodiment may include the eighteenth embodiment, wherein the cost function includes a misfit term and a smoothness term, the smoothness term including a product of a regularization coefficient and a smoothness operator, the smoothness operator including a first term including a product of a horizontal relaxation coefficient and a horizontal smoothness operator and a second term including a product of a vertical relaxation coefficient and a vertical smoothness operator; and iteratively updating the model further includes selecting a regularization coefficient that minimizes the misfit term of the cost function and selecting an updated value for at least one of the horizontal relaxation coefficient and the vertical relaxation coefficient.

Although anisotropic resistivity and dielectric constant measurements of a subterranean formation has been described in detail, it should be understood that various changes, substitutions and alternations can be made herein without departing from the spirit and scope of the disclosure as defined by the appended claims.

What is claimed is:

1. A method for estimating anisotropic resistivity and anisotropic dielectric constant of a subterranean formation, the method comprising:
acquiring electromagnetic propagation measurements made in a wellbore penetrating the subterranean formation;
acquiring simulated propagation measurements using a model, the model including a one-dimensional formation model having a plurality of formation layers, each of the plurality of formation layers including an anisotropic resistivity and an anisotropic dielectric constant; and
iteratively updating the model with new values of the anisotropic resistivity and the anisotropic dielectric constant until a cost function is less than a threshold to compute vertical and horizontal resistivity values and vertical and horizontal dielectric constant values of each of the plurality of formation layers, wherein the iteratively updating includes (i) computing a Jacobian for dip, azimuth, and the anisotropic resistivity and (ii) deriving the Jacobian for the anisotropic dielectric constant, wherein iteratively updating the model further includes iterative selection of a value of a regularization coefficient that minimizes a misfit term of the cost function, wherein iterative selection of the regularization coefficient provides the model as a best fit of the electromagnetic propagation measurements made in the wellbore penetrating the subterranean formation as minimally influenced by noise affecting the electromagnetic propagation measurements,
wherein the cost function includes a misfit term and a smoothness term, wherein the smoothness term of the cost function includes a product of the regularization coefficient and a smoothness operator,
wherein the smoothness operator includes a first term including a product of a horizontal relaxation coefficient and a horizontal smoothness operator and a second term including a product of a vertical relaxation coefficient and a vertical smoothness operator, and
wherein the horizontal relaxation coefficient is not equal to the vertical relaxation coefficient.

2. The method of claim 1, wherein the vertical relaxation coefficient is set to a value that is in a range from 1 percent to 50 percent of a value of the horizontal relaxation coefficient.

3. The method of claim 1, wherein:
the iteratively updating the model further includes computing an updated value for at least one of the horizontal relaxation coefficient and the vertical relaxation coefficient.

4. The method of claim 3, wherein the computing an updated value for at least one of the horizontal relaxation coefficient and the vertical relaxation coefficient comprises computing a first ratio of a trace of a first Hessian matrix of the horizontal smoothness operator and a trace of a second Hessian matrix of the vertical smoothness operator and a second ratio of a trace of a third Hessian matrix of a horizontal data misfit and a trace of a fourth Hessian matrix of a vertical data misfit.

5. The method of claim 4, wherein the updated value for the at least one of the horizontal relaxation coefficient and the vertical relaxation coefficient is equal to a third ratio of the first ratio and the second ratio.

6. The method of claim 1, wherein the acquiring the electromagnetic propagation measurements comprises:
translating an electromagnetic propagation tool along an axis of the wellbore; and
causing the electromagnetic propagation tool to make a plurality of electromagnetic measurements using transmitter receiver couplings that have a plurality of spacings at a plurality of measured depths while translating in the wellbore.

7. The method of claim 1, wherein the cost function is a discretized relation depending on the vertical and horizontal resistivity values and the vertical and horizontal dielectric constant values of each of the plurality of formation layers.

8. The method of claim 1, wherein the iteratively updating the model comprises using a Gauss-Newton method to iteratively determine vertical and horizontal resistivity values and the vertical and horizontal dielectric constant values of each of the plurality of formation layers.

9. The method of claim 1, wherein the electromagnetic propagation measurements comprise attenuation and phase shift measurements made at one or more frequencies in a range from 1 kHz to 10 MHz.

10. The method of claim 1, further comprising utilizing the vertical and horizontal resistivity values and vertical and horizontal dielectric constant values of each of the plurality of formation layers to directionally steer drilling in the wellbore as part of a geosteering operation.

11. A method for estimating anisotropic resistivity and dielectric constant values of a subterranean formation, the method comprising:
acquiring a plurality of electromagnetic propagation measurements made in a wellbore penetrating the subterranean formation, the plurality of electromagnetic propagation measurements including measurements made at a plurality of measured depths in the wellbore and with transmitter receiver couplings having a plurality of spacings along an electromagnetic propagation logging tool; and
inverting the plurality of electromagnetic propagation measurements using a model, the model including a one-dimensional formation model including a plurality of formation layers to compute vertical and horizontal resistivity values and vertical and horizontal dielectric constant values of each of the plurality of formation layers, wherein the inverting comprises:
selecting the vertical and horizontal resistivity values and the vertical and horizontal dielectric constant values that minimize a cost function, the cost function including a misfit term and a smoothness term, wherein the smoothness term of the cost function includes a product of a regularization coefficient and a smoothness operator, wherein the smoothness operator includes a first term including a product of a horizontal relaxation coefficient and a horizontal smoothness operator and a second term including a product of a vertical relaxation coefficient and a vertical smoothness operator;
iteratively computing an updated value for at least one of the horizontal relaxation coefficient and the vertical relaxation coefficient; and
iteratively selecting the regularization coefficient that minimizes the misfit term of the cost function, wherein iterative selection of the regularization coefficient provides the model as a best fit of the plurality of electromagnetic propagation measurements made in the wellbore penetrating the subterranean formation as minimally influenced by noise affecting the electromagnetic propagation measurements.

12. The method of claim 11, wherein:
the vertical relaxation coefficient is set to a value that is in a range from 1 percent to 50 percent of a value of the horizontal relaxation coefficient.

13. The method of claim 11, wherein the computing an updated value for at least one of the horizontal relaxation coefficient and the vertical relaxation coefficient comprises computing a first ratio of a trace of a Hessian matrix of the horizontal smoothness operator and a trace of a Hessian matrix of the vertical smoothness operator and a second ratio of a trace of a Hessian matrix of a horizontal data misfit and a trace of a Hessian matrix of a vertical data misfit.

14. A system comprising:
a downhole electromagnetic logging tool configured to make a plurality of electromagnetic propagation measurements of a subterranean formation;
a processor; and
memory storing instructions configured to be executed by the processor, the instructions comprising instructions to:
acquire electromagnetic propagation measurements made in a wellbore penetrating the subterranean formation;
compute simulated propagation measurements using a model, the model including a one-dimensional formation model having a plurality of formation layers, each of the plurality of formation layers including an anisotropic resistivity and an anisotropic dielectric constant; and
iteratively update the model with new values of the anisotropic resistivity and the anisotropic dielectric constant until a cost function is less than a threshold to compute vertical and horizontal resistivity values and vertical and horizontal dielectric constant values for each of the plurality of formation layers, the cost function including a misfit term and a smoothness term, wherein the smoothness term of the cost function includes a product of a regularization coefficient and a smoothness operator, wherein the smoothness operator includes a first term including a product of a horizontal relaxation coefficient and a horizontal smoothness operator and a second term including a product of a vertical relaxation coefficient and a vertical smoothness operator, the vertical relaxation coefficient being set to a value that in a range from 1 percent to 50 percent of a value of the horizontal relaxation coefficient, wherein iteratively updating the model further includes iterative selection of a value of the regularization coefficient that minimizes a misfit term of the cost function, wherein iterative selection of the regularization coefficient provides the model as a best fit of the electromagnetic propagation measurements made in the wellbore penetrating the subterranean formation as minimally influenced by noise affecting the electromagnetic propagation measurements.

* * * * *